US007970847B1

(12) United States Patent
Runstedler et al.

(10) Patent No.: US 7,970,847 B1
(45) Date of Patent: Jun. 28, 2011

(54) METHOD AND APPARATUS FOR PROCESSING DATA ON A COMPUTING DEVICE

(75) Inventors: Christopher James Runstedler, Cambridge (CA); Marion Catherine Fox, Cambridge (CA); Nancy Anne McMillan, Waterloo (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

(21) Appl. No.: 12/684,262

(22) Filed: Jan. 8, 2010

(51) Int. Cl.
*G06F 15/16* (2006.01)
(52) U.S. Cl. .................. 709/206; 709/207; 709/224
(58) Field of Classification Search .............. 709/206, 709/207, 223, 224
See application file for complete search history.

(56) References Cited

U.S. PATENT DOCUMENTS

| 7,502,831 | B1* | 3/2009 | Macias et al. | 709/206 |
|---|---|---|---|---|
| 7,769,815 | B2* | 8/2010 | Wang et al. | 709/206 |
| 2002/0120600 | A1* | 8/2002 | Schiavone et al. | 707/1 |
| 2002/0175950 | A1* | 11/2002 | Kuiken et al. | 345/785 |
| 2003/0014490 | A1 | 1/2003 | Bates et al. | |
| 2003/0046421 | A1* | 3/2003 | Horvitz et al. | 709/206 |
| 2006/0010217 | A1* | 1/2006 | Sood | 709/206 |
| 2006/0195785 | A1 | 8/2006 | Portnoy et al. | |
| 2008/0126951 | A1 | 5/2008 | Sood et al. | |
| 2008/0183750 | A1* | 7/2008 | Lee et al. | 707/104.1 |
| 2009/0037350 | A1* | 2/2009 | Rudat | 709/206 |
| 2009/0113246 | A1* | 4/2009 | Sabato et al. | 714/37 |
| 2010/0235367 | A1* | 9/2010 | Chitiveli et al. | 709/206 |

OTHER PUBLICATIONS

Meitar Moscovitz: "HowTo: Use Rules to 1-12 Automatically Manage Email in Apple Mail" Internet Jul. 27, 2009, XP002586393 Retrieved from the Internet: URL:http://maymay.net/blog/2009/07/27howto-rules-to-automatically-manage-emailin-apple-mail/>.
European Patent Application No. 10150300.1 Search Report dated Jun. 29, 2010.
Filtering Junk E-Mail, downloaded from http://www.cbsnews.com/stories/2004/01/27/scitech/pcanswer/main596296. shtml.
Sort Emails, downloaded from http://www.internet-soft.com/e-mail-client/sort-emails/sort-emails.htm.
Create Rules to Automatically Organize Mail, downloaded from http://www.internet-soft.com/e-mail-client/sort-emails/sort-emails.htm.

* cited by examiner

*Primary Examiner* — Philip B Tran
(74) *Attorney, Agent, or Firm* — Perry + Currier

(57) ABSTRACT

A method and computing device for processing data are provided. Rule data for visually coding incoming data is stored. First and second profile data are stored, independent of the rule data. Each profile data comprises a respective range of time and a respective recurrence pattern that repeats indefinitely. Each profile data is associated with a respective subset of the rule data. Respective indications are received that first profile data and second profile have been activated. In response, the respective subset is automatically applied during the respective range of time such that incoming data is visually coded at the display device according to the respective subset during the respective range of time. Automatic application of the respective subset during the respective range of time repeats indefinitely according to the respective recurrence pattern until another indication that the respective profile data has been deactivated is received.

20 Claims, 10 Drawing Sheets

| REPLY | REPLY TO ALL | FORWARD | 18:30 Thursday November 26, 2009 |
|---|---|---|---|

Messaging Application Header

| INBOX | | |
|---|---|---|
| FROM | SUBJECT | RECEIVED |
| Nancy Spence | Re: Patent Meeting | Thurs 26/11/2009 20:03 |
| Cathy Johannson | Message from CEO | Thurs 26/11/2009 18:13 |
| Cathy Johannson | Your Sales Figures | Thurs 26/11/2009 16:59 |
| Nancy Spence | Patent Meeting | Thurs 26/11/2009 14:22 |
| Bill Johnson | November's Sales | Thurs 26/11/2009 11:20 |
| Ed Jones | Sales Meeting | Thurs 26/11/2009 09:02 |

Fig. 2

| | Messaging Application Header | |
|---|---|---|
| REPLY | REPLY TO ALL | FORWARD | 09:30 Friday November 27, 2009 |
| INBOX | | |
| FROM | SUBJECT | RECEIVED |
| Cathy Johansson | Re: Your Sales Figures | Fri 27/11/2009 09:01 |
| Cathy Johansson | Re: Patent Meeting | Thurs 26/11/2009 20:04 |
| Nancy Spence | Re: Patent Meeting | Thurs 26/11/2009 20:03 |
| Cathy Johansson | Message from CEO | Thurs 26/11/2009 18:13 |
| Cathy Johansson | Your Sales Figures | Thurs 26/11/2009 16:59 |
| Nancy Spence | Patent Meeting | Thurs 26/11/2009 14:22 |
| Bill Johnson | November's Sales | Thurs 26/11/2009 11:20 |
| Ed Jones | Sales Meeting | Thurs 26/11/2009 09:02 |

Fig. 3

| Messaging Application Header | |
|---|---|
| REPLY \| REPLY TO ALL \| FORWARD | 09:30 Friday November 27, 2009 |

INBOX

| FROM | SUBJECT | RECEIVED |
|---|---|---|
| Cathy Johansson | Re: Your Sales Figures | Fri 27/11/2009 09:01 |
| Cathy Johansson | Re: Patent Meeting | Thurs 26/11/2009 20:04 |
| Nancy Spence | Re: Patent Meeting | Thurs 26/11/2009 20:03 |
| Cathy Johansson | Message from CEO | Thurs 26/11/2009 18:13 |
| Cathy Johansson | Your Sales Figures | Thurs 26/11/2009 16:59 |
| Nancy Spence | Patent Meeting | Thurs 26/11/2009 14:22 |
| Bill Johnson | November's Sales | Thurs 26/11/2009 11:20 |
| Ed Jones | Sales Meeting | Thurs 26/11/2009 09:02 |

Fig. 4

METHOD AND APPARATUS FOR PROCESSING DATA ON A COMPUTING DEVICE

FIELD

The specification relates generally to computing devices, and specifically to a method and apparatus for processing data on a computing device.

BACKGROUND

When large number of emails arrive per day, it is often difficult to determine which emails should be viewed urgently vs. e-mails which are not urgent. While a simple colour coding system has been used in the prior art to assign a given colour and/or flag to given types of e-mail (e.g. based on a sender's e-mail address, a subject line etc.), such a system does not address a problem of automatically determining when a given e-mail should be urgently addressed according to a status. For example, an e-mail can be urgent, but not urgent enough to respond to during certain time periods (e.g. evenings, weekends, vacations).

BRIEF DESCRIPTIONS OF THE DRAWINGS

Embodiments are described with reference to the following figures, in which:

FIGS. 2 to 4 depict representations of an application for processing data, according to non-limiting embodiments;

DETAILED DESCRIPTION OF THE EMBODIMENTS

Figure 1:
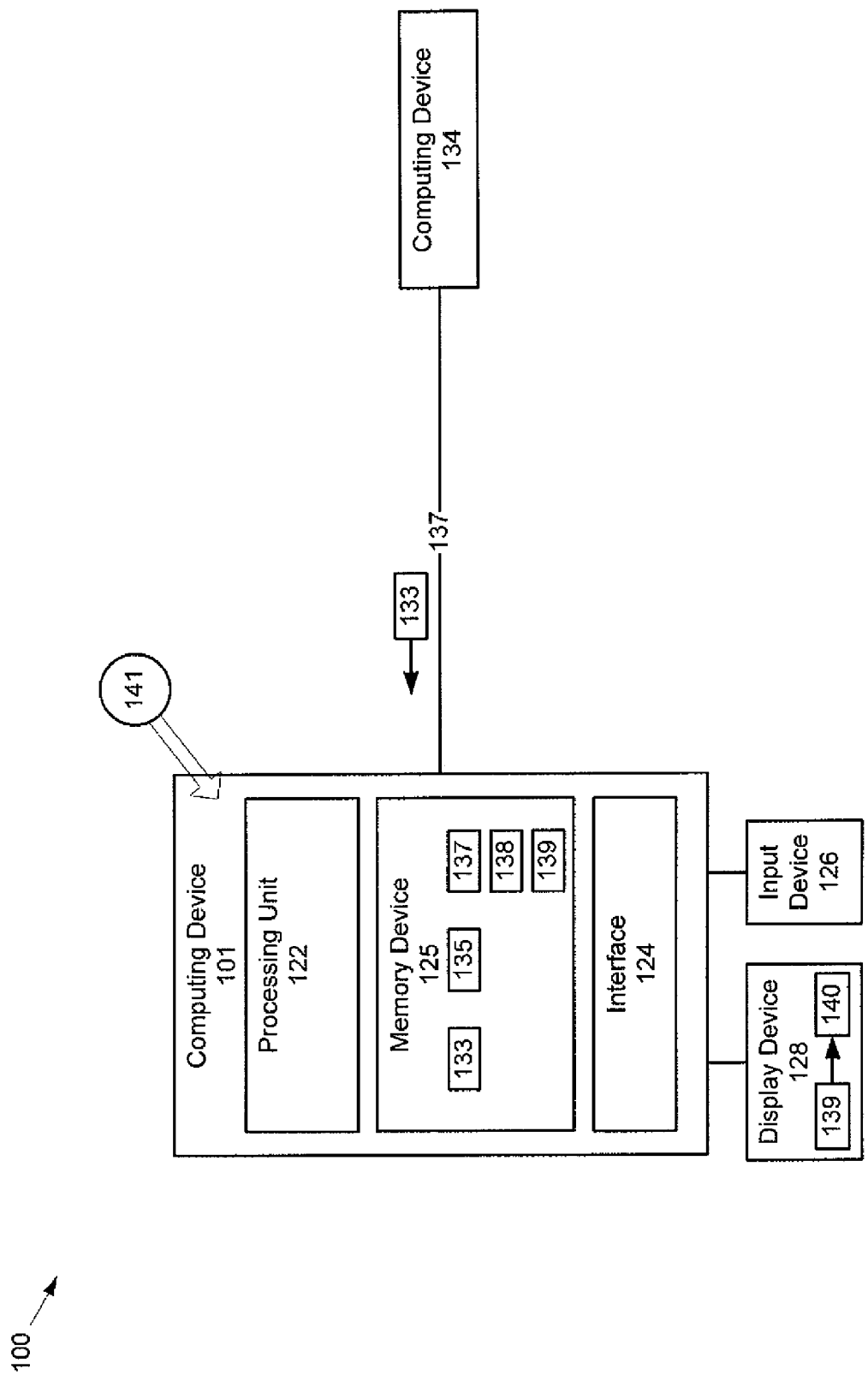
FIG. 1 depicts a block diagram of a system including a computing device for processing data, according to non-limiting embodiments.

A first aspect of the specification provides a method for processing data on a computing device, the computing device comprising a processing unit interconnected with a display device. The method comprises storing profile data comprising at least a start threshold, the profile data associated with rule data, the rule data comprising data for visually coding incoming data. The method further comprises automatically applying the rule data when the start threshold is met such that the incoming data is visually coded at the display device according to the rule data.

The method can further comprise automatically ceasing application of the rule data to the incoming data when an end threshold of the profile data is met, such that the incoming data is no longer visually coded at the display device according to the rule data.

The method can further comprise automatically ceasing application of the rule data to the incoming data when a second start threshold of second profile data is met, such that the incoming data is no longer visually coded at the display device according to the rule data. The method can further comprise automatically applying second rule data associated with the second profile data when the second start threshold is met such that the incoming data is visually coded at the display device according to the second rule data.

The method can further comprise automatically ending visual coding of previously received data when an end threshold of the profile data is met.

The processing unit can be further interconnected with a memory device storing the profile data and the rule data.

Automatically applying the rule data when the start threshold is met can occur in an application on the computing device, the incoming data comprising message data, wherein the application comprises at least one of a messaging application, an e-mail application, a voicemail application, an instant messaging application, an MMS (multimedia messaging service) application, an SMS (short message service) application, and a texting application.

The start threshold comprises at least one of a time of day, a day of week, a date, an indication of a beginning of a weekend, an indication of an end of a work day, an indication of a beginning of a vacation, and the start threshold can be based on at least one of usage of the computing device and user behaviour.

The rule data for visually coding the incoming data can be based on at least one of a subject of the incoming data, a network address associated with the incoming data, an alias, and at least one keyword within the incoming data.

The incoming data can be visually coded according to at least one of colour, font, and shading.

A second aspect of the specification provides a computing device for processing data. The computing device comprises a processing unit interconnected with a display device. The processing unit is enabled to: store profile data comprising at least a start threshold, the profile data associated with rule data, the rule data comprising data for visually coding incoming data; and automatically apply the rule data when the start threshold is met such that the incoming data is visually coded at the display device according to the rule data.

The processing unit can be further enabled to automatically cease application of the rule data to the incoming data when an end threshold of the profile data is met, such that the incoming data is no longer visually coded at the display device according to the rule data.

The processing unit can be further enabled to automatically cease application of the rule data to the incoming data when a second start threshold of second profile data is met, such that the incoming data is no longer visually coded at the display device according to the rule data. The processing unit can be further enabled to automatically apply second rule data associated with the second profile data when the second start threshold is met such that the incoming data is visually coded at the display device according to the second rule data.

The processing unit can be further enabled to automatically end visual coding of previously received data when an end threshold of the profile data is met.

The processing unit can be further interconnected with a memory device storing the profile data and the rule data.

Automatically applying the rule data when the start threshold is met can occur in an application on the computing device, the incoming data comprising message data, wherein the application comprises at least one of a messaging application, an e-mail application, a voicemail application, an instant messaging application, an MMS (multimedia messaging service) application, an SMS (short message service) application, and a texting application.

The start threshold can comprise at least one of a time of day, a day of week, a date, an indication of a beginning of a weekend, an indication of an end of a work day, an indication of a beginning of a vacation, and the start threshold can be based on at least one of usage of the computing device and user behaviour.

The rule data for visually coding the incoming data can be based on at least one of a subject of the incoming data, a network address associated with the incoming data, an alias, and at least one keyword within the incoming data.

The incoming data can be visually coded according to at least one of colour, font, and shading.

A third aspect of the specification provides a computer program product, comprising a computer usable medium having a computer readable program code adapted to be executed to implement a method for processing data on a computing device, the computing device comprising a processing unit interconnected with a display device. The method comprises storing profile data comprising at least a start threshold, the profile data associated with rule data, the rule data comprising data for visually coding incoming data. The method further comprises automatically applying the rule data when the start threshold is met such that the incoming data is visually coded at the display device according to the rule data.

A fourth aspect of the specification provides a method for processing data on a computing device, the computing device comprising a processing unit interconnected with a display device. The method comprises storing rule data comprising data for visually coding incoming data. The method further comprises storing first profile data comprising a first range of time and a first recurrence pattern that repeats indefinitely, the first profile data generated independent of the rule data. The method further comprises storing second profile data comprising a second range of time and a second recurrence pattern that repeats indefinitely, the second profile data generated independent of the rule data and the first profile data. The method further comprises associating the first profile data with a first subset of the rule data. The method further comprises associating the second profile data with a second subset of the rule data. The method further comprises receiving a first indication that the first profile data has been activated and in response automatically applying the first subset during the first range of time such that the incoming data is visually coded at the display device according to the first subset during the first range of time, automatic application of the first subset during the first range of time repeating indefinitely according to the first recurrence pattern until a second indication that the first profile data has been deactivated is received. The method further comprises receiving a third indication that the second profile data has been activated and in response automatically applying the second subset during the second range of time such that the incoming data is visually coded at the display device according to the second subset during the second range of time, automatic application of the second subset during the second range of time repeating indefinitely according to the second recurrence pattern until a fourth indication that the first profile data has been deactivated is received.

The first profile data and the second profile data can each be generated upon receipt of respective input data at an input device interconnected with the processing unit.

The first range of time can comprise a first start threshold and a first end threshold, receiving the first indication that the first profile data has been activated comprising receiving an indication that the first start threshold has been met, and the second indication comprising an indication that the first end threshold has been met.

The second range of time can comprise a second start threshold and a second end threshold, the receiving the third indication that the second profile data has been activated comprising receiving an indication that the second start threshold has been met, and the fourth indication comprising an indication that the second end threshold has been met.

Each of the first recurrence pattern and the second recurrence pattern can comprise at least one of every day, every week, every weekend every holiday, every workday, every workday evening, every vacation and every holiday.

The method can further comprise updating at least one of the first range of time, the first recurrence pattern, the second range of time and the second recurrence pattern based on at least one of usage of the computing device and user behaviour.

The method can further comprise deactivating the first profile data when the second profile data is activated.

The method can further comprise resolving conflicts between the first profile data and the second profile data based on respective priorities.

The processing unit can be further interconnected with a memory device storing the profile data and the rule data.

Automatically applying the first profile data and automatically applying the second profile data can occur in an application on the computing device, the application comprising at least one of a messaging application, an e-mail application, a voicemail application, an instant messaging application, an MMS (multimedia messaging service) application, an SMS (short message service) application, and a texting application, and the incoming data comprising message data.

A fifth aspect of the specification provides a computing device for processing data. The computing device comprises a processing unit interconnected with a memory device and a display device. The processing unit enabled to: store rule data in the memory device, the rule data comprising data for visually coding incoming data; store first profile data in the memory device, the first profile data comprising a first range of time and a first recurrence pattern that repeats indefinitely, the first profile data generated independent of the rule data; store second profile data in the memory device, the second profile data comprising a second range of time and a second recurrence pattern that repeats indefinitely, the second profile data generated independent of the rule data and the first profile data; associate the first profile data with a first subset of the rule data; associate the second profile data with a second subset of the rule data; receive a first indication that the first profile data has been activated and in response automatically apply the first subset during the first range of time such that the incoming data is visually coded at the display device according to the first subset during the first range of time, automatic application of the first subset during the first range of time repeating indefinitely according to the first recurrence pattern until a second indication that the first profile data has been deactivated is received; and receive a third indication that the second profile data has been activated and in response automatically apply the second subset during the second range of time such that the incoming data is visually coded at the display device according to the second subset during the second range of time, automatic application of the second subset during the second range of time repeating indefinitely according to the second recurrence pattern until a fourth indication that the first profile data has been deactivated is received.

The first profile data and the second profile data can each be generated upon receipt of respective input data at an input device interconnected with the processing unit.

The first range of time can comprise a first start threshold and a first end threshold, the processing unit further enabled to receive the first indication that the first profile data has been activated by receiving an indication that the first start threshold has been met, and the second indication comprising an indication that the first end threshold has been met.

The second range of time can comprise a second start threshold and a second end threshold, the processing unit further enabled to receive the third indication that the second profile data has been activated comprising receiving an indication that the second start threshold has been met, and the fourth indication comprising an indication that the second end threshold has been met.

Each of the first recurrence pattern and the second recurrence pattern can comprise at least one of every day, every week, every weekend every holiday, every workday, every workday evening, every vacation and every holiday.

The processing unit can be further enabled to update at least one of the first range of time, the first recurrence pattern, the second range of time and the second recurrence pattern based on at least one of usage of the computing device and user behaviour.

The processing unit can be further enabled to deactivate the first profile data when the second profile data is activated.

The processing unit can be further enabled to resolve conflicts between the first profile data and the second profile data based on respective priorities.

The processing unit can be further enabled to automatically apply the first profile data and the automatically apply the second profile data in an application on the computing device, the application comprising at least one of a messaging application, an e-mail application, a voicemail application, an instant messaging application, an MMS (multimedia messaging service) application, an SMS (short message service) application, and a texting application, and the incoming data comprising message data.

A sixth aspect of the specification provides computer program product, comprising a computer usable medium having a computer readable program code adapted to be executed to implement a method for processing data on a computing device, the computing device comprising a processing unit interconnected with a display device, the method comprising: storing rule data comprising data for visually coding incoming data; storing first profile data comprising a first range of time and a first recurrence pattern that repeats indefinitely, the first profile data generated independent of the rule data; storing second profile data comprising a second range of time and a second recurrence pattern that repeats indefinitely, the second profile data generated independent of the rule data and the first profile data; associating the first profile data with a first subset of the rule data; associating the second profile data with a second subset of the rule data; receiving a first indication that the first profile data has been activated and in response automatically applying the first subset during the first range of time such that the incoming data is visually coded at the display device according to the first subset during the first range of time, automatic application of the first subset during the first range of time repeating indefinitely according to the first recurrence pattern until a second indication that the first profile data has been deactivated is received; and receiving a third indication that the second profile data has been activated and in response automatically applying the second subset during the second range of time such that the incoming data is visually coded at the display device according to the second subset during the second range of time, automatic application of the second subset during the second range of time repeating indefinitely according to the second recurrence pattern until a fourth indication that the first profile data has been deactivated is received.

FIG. 1 depicts a system 100 comprising a computing device 101 for processing data, according to non-limiting embodiments. Computing device 101 generally comprising a processing unit 122 interconnected with a memory device 125, an input device 126 and a display device 128. As depicted, input device 126 and display device 128 are external to computing device 101, however in other embodiments, computing device 101 can comprise input device 126 and display device 128. Computing device 101 is enabled to receive incoming data 133, hereinafter referred to as data 133, from at least a second computing device 134 via a link 137. Data 133 can comprise at least one of message data, e-mail data, a voicemail data, instant messaging data, MMS (multimedia messaging service) data, SMS (short message service) data, and texting data. However, in exemplary embodiments described hereafter, data 133 will be described with respect to e-mails, though this is not to be considered unduly limiting. Furthermore, it is understood that similar methods and systems comprising other message data are within the scope of present embodiments. Memory device 125 is enabled to store data 133, profile data 135 and rule data 137, described below. While only data 133 is depicted in FIG. 1, it is understood that memory device 125 can store any suitable number of sets of incoming data, one for each message received for example.

In any event, data 133 can be displayed at display device 128 via an application 141 at computing device 101, which can be stored in memory device 125 and processed by processing unit 122. Application 141 can comprise at least one of a messaging application, an e-mail application, a voicemail application, an instant messaging application, an MMS (multimedia messaging service) application, an SMS (short message service) application, and a texting application, application 141 generally compatible with data 133. Upon processing application 141, processing unit 122 can control circuitry 139 in display device 128 to provide a representation 140 of application 141.

For example, FIG. 2 depicts representation 140 of application 141, according to exemplary non-limiting embodiments. While in embodiments depicted in FIG. 2, application 141 comprises a messaging/e-mail application, it is understood that in other embodiments, application 141 can comprise any suitable application. In any event, from FIG. 2 it is understood that representation 140 of application 141 comprises a representation 201 of an "INBOX" for providing indications of message data, such as data 133. For example, representation 201 comprises a list of message data received from various network addresses, as indicated in a field 203 ("FROM"), on various subjects, as indicated in a filed 205 ("SUBJECT"), as well a field 207 for indicating when the message data was received ("RECEIVED"). It is understood that the data in field 203 can comprise an alias of an underlying network address: for example "Cathy Johannson" can represent a network address of second computing device 134. It is further understood that further message data, such as a body of an e-mail, can be provided in representation 140 when input data is received indicating that a given set of message data has been chosen for opening (e.g. a message in the list in representation 201 is clicked on using a pointing device). It is furthermore understood that each line of representation 201 corresponds to a different set of incoming data, similar to incoming data 133, as represented by lines 211, 213, 214 which will be described in further detail below.

It is understood that representation 140 of application 141 can further comprise a header 215 and virtual buttons 217, 219, 221 which, when actuated, can cause processing unit 122 to respectively initiate a "REPLY", a "REPLY TO ALL", or a "FORWARD" to/of a highlighted message in the list of representation 201.

It is further understood that representation of application 141 can further comprise an indication 221 of a present time and date ("18:30 Thursday Nov. 26, 2009").

Returning now to FIG. 1, rule data 137 can comprise data for visually coding data 133 in representation 140, rule data 137 for visually coding data 133 is based on at least one of a subject of data 133, a network address associated with data 133, an alias, and at least one keyword within data 133, or the like. Furthermore, visual coding of data 133 can comprise at least one of visually coded according to at least one of colour, font, and shading, and different set of rule data within rule data 137 can be associated with different types of visual coding. Five non-limiting examples of a set of rule data comprising various criteria for visually coding data 133 are provided in Table 1, though the number of sets of rule data is not be considered unduly limiting, and rule data 137 can comprise more or fewer sets of rule data as desired; in some embodiments, rule data 137 can comprise Table 1:

TABLE 1

| 1 | SUBJECT | Equals   | "CEO"             | RIGHT HATCHING |
| 2 | SUBJECT | Contains | "CEO"             | RIGHT HATCHING |
| 3 | FROM    | Equals   | "Cathy Johannson" | BOLD FONT      |
| 4 | BODY    | Contains | "URGENT"          | LEFT HATCHING  |
| 5 | BODY    | Contains | "Urgent"          | RED            |

While Table 1 is arranged in rows and columns, rule data 137 can comprise any suitable format. In any event, each line in Table 1 comprises a different set of criteria. For example, line 1 indicates that when a subject of data 133, as represented by the text in field 207 of representation 201, equals a given set of alpha-numeric characters, such as "CEO", then an associated line in representation 201 is to be shaded with right hatching. Similarly, line 2 indicates that when a subject of data 133, as represented by the text in field 207 of representation 201, contains a given set of alpha-numeric characters, such as "CEO", then an associated line in representation 201 is to be shaded with right hatching. Line 3 of Table 1 indicates that when a network address associated with data 133, as represented by the text in field 203 of representation 201, equals a given set of alpha-numeric characters, such as "Cathy Johannson" (and/or a given network address and/or a given alias), then an associated line in representation 201 is to be visually coded with a bold font. Lines 4 and 5 of Table 1 indicates that when a body of data 133 (e.g. the body of an e-mail, not depicted) contains a given set of alpha-numeric characters, such as "Urgent", then an associated line in representation 201 is to be shaded with left hatching and coloured red.

It is understood that rule data 137 can comprise any suitable number of rules for visually coding data 133 in representation 140.

While only rules pertaining to fields of messages and/or e-mails are provided in Table 1, it is understood that rule data 137 can comprise any suitable types of rules.

In some embodiments, rule data 137 can be generated using a suitable representation of an application for generating rules, such as representation 700 depicted in FIG. 7 described below.

In some embodiments, memory device 125 can store any suitable number of sets of rule data, for example rule data 138, 139. Each of rule data 138, 139 can be similar or different to rule data 137. For example, at least part of one of rule data 138, 139 can comprise a subset of rule data 137, or at least one of rule data 138, 139 can comprise a superset of rule data 137. However, in other embodiments at least part one of rule data 138, 139 can comprise a different set of data for visually coding data 133.

For example, rule data 138 can comprise a set of rule data that defines that when a "FROM" field of data 133 contains "Cathy Johannson", then an associated line in representation 201 is to be shaded with right hatching. Similarly, rule data 139 can comprise a set of rule data that defines that when a "FROM" field of data 133 contains "Cathy Johannson", then an associated line in representation 201 is to be coloured with red.

Profile data 135 comprises at least a start threshold for automatically applying rule data 137 such that when the start threshold is met data 133 is visually coded at display device 128 according to rule data 137. Profile data 135 can further comprise an end threshold for ceasing application of rule data 137. In some embodiments, at least one of the start threshold and the end threshold can comprise at least one of a time of day, a day of the week, a date, an indication of a beginning of a weekend, an indication of an end of a work day, and an indication of a beginning of a vacation.

Five non-limiting examples of profile data comprising various criteria for visually coding data 133 are provided in Table 2; in some embodiments, profile data 135 can comprise at least one line of Table 2:

TABLE 2

|   | Profile Name | Start Threshold | End Threshold   | Rule Data |
|---|--------------|-----------------|-----------------|-----------|
| 1 | Evenings     | 17:00 Weekdays  | 09:00 Weekdays  | 137       |
| 2 | Weekends     | 17:00 Fridays   | 09:00 Mondays   | 138       |
| 3 | Workdays     | 09:30 Weekdays  | 17:00 Weekdays  | None      |
| 4 | Holidays     | December 25     |                 | 138       |
| 5 | Vacations    | Feb. 11, 2010   | Feb. 23, 2010   | 139       |

While Table 2 is arranged in rows and columns, profile data 135 can comprise any suitable format. In any event, each line in Table 2 comprises a different set of profile data comprising a "Profile Name", a start threshold, an end threshold (in some instances) and an indicator of the set of rule data that is to be applied when the start threshold is met. For example, line 1 comprises profile data named "Evenings", having a start threshold at 17:00 weekdays and an end threshold of at 09:00 weekdays. Hence, on weekdays, between the hours of 17:00 and 09:00 the next morning, rule data 137 is to be applied such that data 133 is visually coded at display device 128 according to rule data 137.

Similarly, line 2 of Table 2 comprises profile data named "Weekends", having a start threshold at 17:00 on Fridays and an end threshold at 09:00 on Mondays. Hence, weekends, between the hours of 17:00 on Friday and 09:00 on Monday, rule data 137 is to be applied such that data 133 is visually coded at display device 128 according to rule data 138.

Line 3 of Table 2 comprises profile data named "Workdays", having a start threshold at 09:30 on Weekdays and an end threshold of 17:00 on Weekdays. Hence, weekdays, between the hours of 09:30 and 17:00, no rule data is to be applied such that data 133 is not visually coded at display device 128. It is understood that between 09:00 and 09:30 on weekdays, there is a 30 minute gap during which no profile data 135 is active.

Line 4 of Table 2 comprises profile data named "Holidays", having a start threshold of December 25. While no end threshold is provided, it is understood that profile data "Holidays" is to be applied on December 25 and not applied before or after. Hence, on December 25, between the hours of 00:00 and 23:59, rule data 138 is to be applied such that data 133 is visually coded at display device 128 according to rule data 138.

Finally, Line 5 of Table 2 comprises profile data named "Vacations", having a start threshold of Feb. 11, 2010 and an end threshold of Feb. 23, 2010. Hence, from Feb. 11, 2010 to Feb. 23, 2010 (e.g. 0:00 on Feb. 11, 2010 to 23:59 on Feb. 23, 2010), rule data 139 is to be applied such that data 133 is visually coded at display device 128 according to rule data 139.

It is understood that profile data 135 is generated and stored independently of rule data 137.

It is understood that memory device 125 can store any suitable number of sets of profile data, according to any suitable criteria.

For example, in some embodiments, at least one of the start threshold and the end threshold can be based on at least one of usage of computing device 101 and behaviour of a user of computing device 101. In some embodiments, computing device 101 can be enabled to at least one of monitor usage of computing device 101, monitor presence of a user associated with computing device 101, and/or communicate with a presence server (not depicted) to request presence data and/or behaviour data of the user associated with computing device 101. In any event, computing device 101 can then generate and store profile data based on at least one of usage of computing device 101 and behaviour of a user of computing device 101. For example, computing device can determine that computing device 101 is in use, on average, from 09:45 to 18:00 every weekday and generate "Workdays" profile data and/or "Evenings" profile data similar to that in Table 2, however with the times adjusted accordingly (e.g. "Workdays" profile data can have start and end thresholds adjusted respectively at 09:45 and 18:00 weekdays; in some embodiments, the start threshold of the "Evenings" profile data can also be adjusted to 18:00 to prevent overlap of profile data).

In general, only one set of profile data is active at any given time, however in some embodiments, criteria for activating profile data can overlap. For example, "Evenings" can overlap with "Weekends" on Fridays from 17:00 to 11:59; thus there is confusion as to which set of profile data is active, and hence which set of rule data 137, 138 is to be applied. In these embodiments, to resolve conflicts, priorities can be assigned to profile data 133, as represented, for example, by the order provided in Table 2, in which a higher number line can have priority over a lower number line. Hence, "Weekends" have priority over "Evenings" and if a conflict occurs, "Weekends" becomes active. While, in these embodiments, "Workday" has priority over "Weekends" and "Evenings", as the periods of time for each are mutually exclusive, not conflict occurs.

It is understood that any other suitable method of indicating priority is within the scope of present embodiments, and that indications of priority are not to be considered particularly limiting.

In any event, turning again to FIG. 2, it is understood that a present time is 18:30 on Thursday Nov. 26, 2009, hence the "Evening" profile data, within profile data 135 of Table 2, is active: rule data 137 is thus applied to data 133 arriving from 17:00 onwards.

For example, attention is directed to line 211 of FIG. 2 which is representative of data 133 arriving 18:13 on Thursday, Nov. 26, 2009, or after the start threshold criteria has been met for the "Evening" profile data of Table 2. Hence rule data 137 is applied: specifically, the text in field 205 of line 211 meets the criteria of the rule in line 2 of Table 1, in that the SUBJECT contains "CEO", hence line 211 is visually coded with right hatching shading; similarly, the text in field 203 of line 211 meets the criteria of the rule in line 3 of Table 1, in that the FROM field equals "Cathy Johannson", hence the 211 is visually coded with a bold font.

In contrast to line 211, attention is directed to line 213 of FIG. 2 which is representative of incoming data arriving 16:59 on Thursday, Nov. 26, 2009, or before the start threshold criteria has been met for the "Evening" profile data of Table 2. It is understood from Table 2 that 16:59 on Thursday, Nov. 26, 2009 meets the criteria of the "Workdays" profile data of Table 2, in that 16:59 is after 09:00 on a weekday. In either case, it is understood that rule data 137 is not to be applied; indeed, no rule data is to be applied (as per Table 2, "None"). Hence, no visual coding of line 213 occurs.

In further contrast to line 211, attention is directed to line 214 of FIG. 2 which is representative of incoming data arriving 20:03 on Thursday, Nov. 26, 2009, or after the start threshold criteria has been met for the "Evening" profile data of Table 2. Hence rule data 137 is applied: however, as none of the criteria of rule data 137 of Table 1 is met, no visual coding if line 214 occurs.

Consider now FIG. 3, which is substantially similar to FIG. 2 with like elements having like numbers, however the present time is now 09:30 on Friday Nov. 27, 2009, as understood from field 221. It is further understood that two more sets of incoming data, similar to data 133, have arrived at computing device 101, as represented by lines 311, 312. A first set of incoming data arrived from "Cathy Johansson" (as understood from field 203 of line 312) on Thursday November 26 at 20:00 (as understood from field 207 of line 312), i.e. while the "Evenings" profile data was active. Hence, rule data 137 was applied: as the text in the "FROM" field 203 of line 312 contains "Cathy Johansson", line 312 is visually coded with a bold font (e.g. see line 3 of Table 1).

However, a second set of incoming data from "Cathy Johansson" (as understood from field 203 of line 311) arrived on Friday November 27 at 09:01 (as understood from field 207 of line 311), once an end threshold for profile data 137 is met (i.e. 09:00 weekdays). Indeed, in these embodiments, once an end threshold is met (i.e. 09:00 weekdays of the "Weekdays" profile data of Table 2), application of rule data 137 automatically ceases, incoming data is no longer visually coded at display device 128, and hence line 311 is not visually coded.

Consider now another non-limiting embodiment as depicted in FIG. 4, which is substantially similar to FIG. 3 with like elements having like numbers. However, in these embodiments, once an end threshold is met (e.g. 09:00 on weekdays, of the "Evening" profile data) application of rule data 137 to both incoming data 133 and previously received data can automatically cease such that neither incoming data 133 nor previously received data visually coded at display device 128. Such embodiments are understood by comparing FIG. 3 to FIG. 4 in that lines 211 and 312 are visually coded in FIG. 3, while lines 211 and 312 are not visually coded in FIG. 4.

Automatic ceasing of application of rule data 127 can also occur when profile data becomes active. For example, consider embodiments in which profile data 135 comprises the contents of Table 3:

TABLE 3

|   | Profile Name | Start Threshold | End Threshold | Rule Data |
|---|---|---|---|---|
| 1 | Evenings | 17:00 Weekdays |  | 137 |
| 2 | Weekends | 17:00 Fridays |  | 138 |
| 3 | Workdays | 09:30 Weekdays |  | None |
| 4 | Holidays | 00:00 | 24:00 | 138 |
| 5 | Vacations | 00:00 | 24:00 | 139 |

Table 3 is similar to Table 2, except that the "Evenings", "Weekends", and "Workdays" profile data have no end threshold. Hence, in these embodiments, once a start threshold is met, given profile data is active until another start threshold is met. In these embodiments, priority of profile data having names containing given keywords, such as "Vacation" can be higher than profile names that do not contain the keywords. For example, "Evening", "Weekends", and "Workdays" profile data can all have equal priority as the respective start thresholds of each define when they are active, as well as when previously active profile data becomes inactive (e.g. "Evening" profile data becomes inactive at 09:30 on Monday when "Weekdays" profile data becomes active); however profile data "Holidays" and "Vacations" interrupt the process of activating each of "Evening", "Weekends", and "Workdays" profile data, in turn, vacations lie outside of the usual workday/evening/weekend flow of daily life. Furthermore, in these embodiments, profile data "Holidays" is understood to be active on each day designated as a holiday in a calendar. Similarly, profile data "Vacations" is understood to be active on each day designated as a vacation day in a calendar. This in contrast to profile data "Holidays" and "Vacations" in Table 2 where each of "Holidays" and "Vacations" is associated with start and end thresholds occurring on a specific day and time.

Returning now to FIG. 1, it is understood that link 137 can comprise any suitable combination of wired and wireless links as desired, such that computing device 101 can receive data from computing device 134 and/or communicate with computing device 134. Hence, link 137 can comprise any suitable combination of wired or wireless communication network, including but not limited to packet based networks, the internet, a local area network (LAN), a wireless local area network (WLAN), a wide area network (WAN), analog networks, the PSTN (public switched telephone network), cellphone networks (including but not limited to CDMA (Code division multiple access), GSM (Global System for Mobile communications), UMTS (Universal Mobile Telecommunications System), 1X, Edge and the like), WiFi and WiMax networks.

In general, computing device 101 comprises any suitable computing device, including but not limited to any suitable combination of personal computers, laptop computing devices, portable computing devices, personal digital assistants (PDA), wireless communication device, wireless computing device, portable electronic device, and the like. Other suitable computing devices are within the scope of present embodiments.

Processing unit 122 comprises any suitable processor, or combination of processors, including but not limited to a microprocessor, a central processing unit (CPU) and the like. Other suitable processing units are within the scope of present embodiments. In particular, processing unit is enabled to process application 141 which can be stored in memory device 125.

Communication interface 124 comprises any suitable wired and/or wireless communication interface, or combination of communication interfaces, enabled to receive data from computing device 134 and/or communicate with computing device 134 via link 137. Accordingly, communication interface 124 is enabled to communicate according to any suitable protocol compatible with link 137, including but not limited to wired protocols, wireless protocols, cell-phone protocols, wireless data protocols, packet based protocols, Internet protocols, analog protocols, PSTN protocols, cell phone protocols, WiFi protocols, WiMax protocols and the like, and/or a combination. Other suitable communication interfaces and/or protocols are within the scope of present embodiments.

Input device 126 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present embodiments.

Memory device 125 can comprise any suitable memory device, including but not limited to any suitable one of or combination of volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present embodiments. In particular, memory device 125 is enabled to store data 133, profile data 135, and rule data 137, as well as application 141.

In some embodiments, data 133, profile data 135, and rule data 137 can be stored in a memory device external and/or remote from computing device 101, but accessible to computing device 101, for example a memory device storing a remote database.

Display device 128 comprises circuitry 139 for generating representations of data, for example representation 140 of application 141. Display device 128 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 139 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 139 can be controlled by processing unit 122 to generate representation 140.

Figure 5:
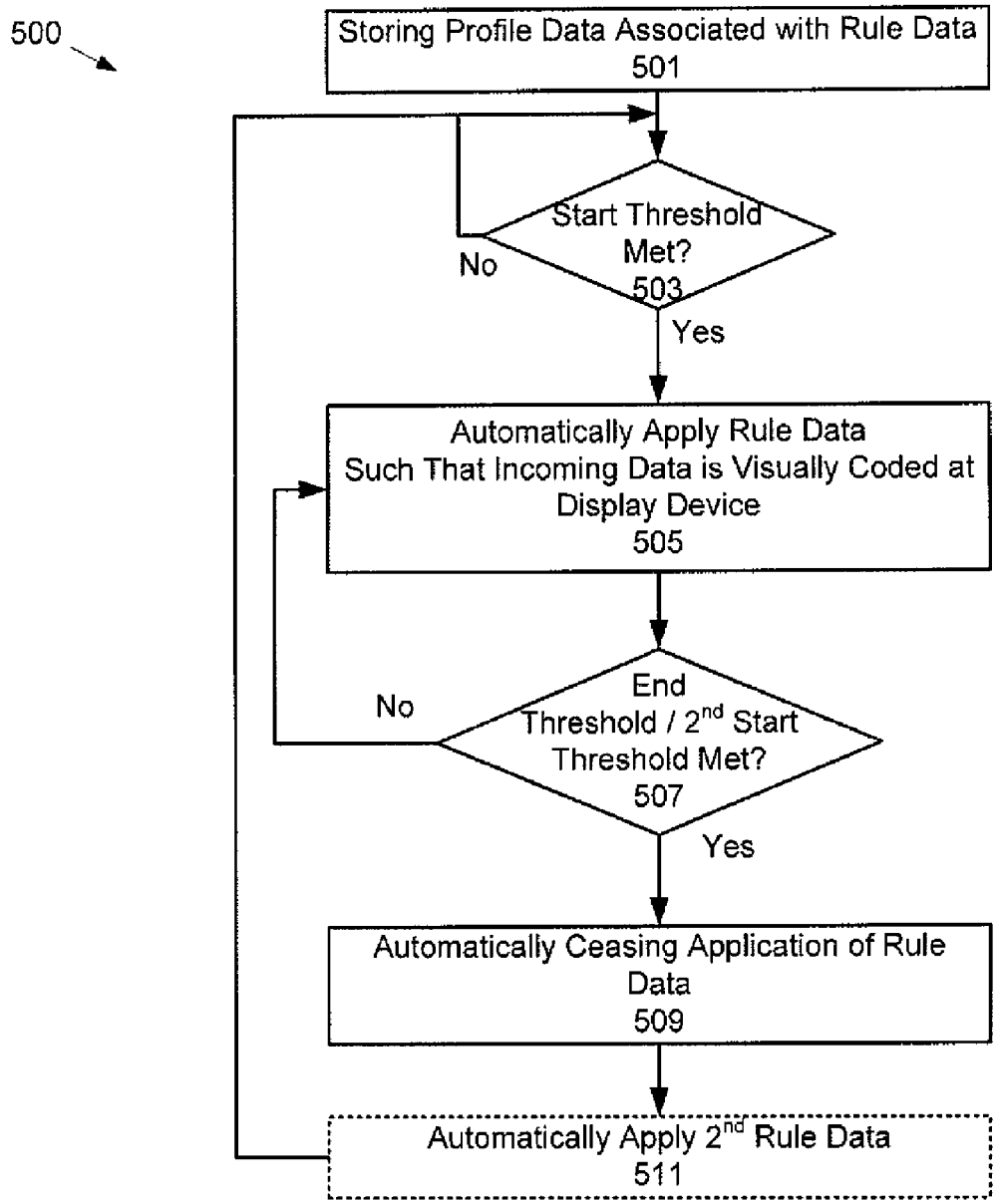
FIG. 5 depicts a flow chart of a method for processing data, according to non-limiting embodiments.

Attention is now directed to FIG. 5 which depicts a method 500 for processing data on a computing device. In order to assist in the explanation of method 500, it will be assumed that method 500 is performed using system 100. Furthermore, the following discussion of method 500 will lead to a further understanding of system 100 and its various components. However, it is to be understood that system 100 and/or method 500 can be varied, and need not work exactly as discussed herein in conjunction with each other, and that such variations are within the scope of present embodiments.

At step 501, profile data 135 is stored, profile data 135 comprising at least a start threshold, profile data 135 associated with rule data 137. In some embodiments, profile data 135 can be determined automatically via monitoring of usage of computing device 101 and/or processing of presence data, as described above. In other embodiments, profile data 135 can be determined by receiving input data from input device 126, the input data comprising data defining the start threshold. It is understood that the start threshold comprises at least one of a time of day, a day of week, a date, an indication of a beginning of a weekend, an indication of an end of a work day, an indication of a beginning of a vacation, and/or can be based on at least one of usage of computing device 101 and user behaviour.

In general it is understood that profile data 135 is associated with rule data, for example at least one of rule data 137, 138, 139 or a combination thereof, rule data 137, 138, 139 comprising data for visually coding incoming data 133. Hence, step 501 can further comprise associating profile data 135 with rule data 137, 138, 139. In particular given rule data 137 is associated with the start threshold in profile data 135. Indeed, it is understood that respective rule data 137, 138, 139 can be associated with one or more start thresholds in profile data 135. It is understood that rule data 137, 138, 139 for visually coding incoming data 133 can be based on at least one of a subject of incoming data 133, a network address associated with incoming data 133 (e.g. a network address of computing device 134), an alias, and at least one keyword within incoming data 133.

At step 503 it is determined if the start threshold of profile data 135 is met. When the start threshold is met as described above, at step 505 the appropriate rule data, for example rule data 137, is automatically applied such that incoming data 133 is visually coded at display device according to the rule data. Otherwise step 503 is repeated, as desired, until the start threshold is met. At step 505, incoming data 133 can be visually coded according to at least one of colour, font, and shading.

Automatic application of rule data 137 continues until, at step 507, at least one of an end threshold in profile data 137 and a second start threshold in profile data 135 is met, as described above. Then, at step 507, application of rule data 137 to incoming data 133 automatically ceases, such that incoming data 133 is no longer visually coded at display device 128 according to rule data 137. Furthermore, though not depicted, it is understood that in some embodiments, at step 507 automatically ending visual coding of previously received data can occur, thereby turning off visual coding that occurred at step 505.

In embodiments where a second start threshold is met at step 507, at an optional step 511, automatic application of second rule data, for example rule data 138, occurs, second rule data associated with the second start threshold, such that incoming data 133 is visually coded at display device 128 according to the second rule data.

After step 509 or step 511, method 500 can be repeated from either step 501 (e.g. new profile data is stored), or step 503, as depicted.

In method 500 it is understood that automatically applying rule data 137, when the start threshold is met, can occur in application 141 on computing device 101. It is further understood that incoming data 133 can comprise any suitable message data, and that application 141 can comprise at least one of a messaging application, an e-mail application, a voicemail application, an instant messaging application, an MMS (multimedia messaging service) application, an SMS (short message service) application, and a texting application.

Hence, by automatically applying rule data in an application, such that certain data is highlighted when certain criteria in given profile data is met, such as a start threshold, use of computing resources of the computing device is reduced, as resources would then have to be used to manually turn on and turn off coding features, such as colour coding. Present embodiments further save on wear and tear of an input device of the computing device as less input data is received to turn coding features on and off. Present embodiments where the computing device comprises a mobile electronic device or the like have particular advantages due to the limited size of the display screen, and hence only a limited number of lines can be displayed: when scrolling through many messages, the messages that are the most urgent, according to the rule data, can be found more easily, and further wear and tear is reduced through automatic application of rule data when criteria in profile data is met, rather than manually turning the feature on and off.

Figure 6:
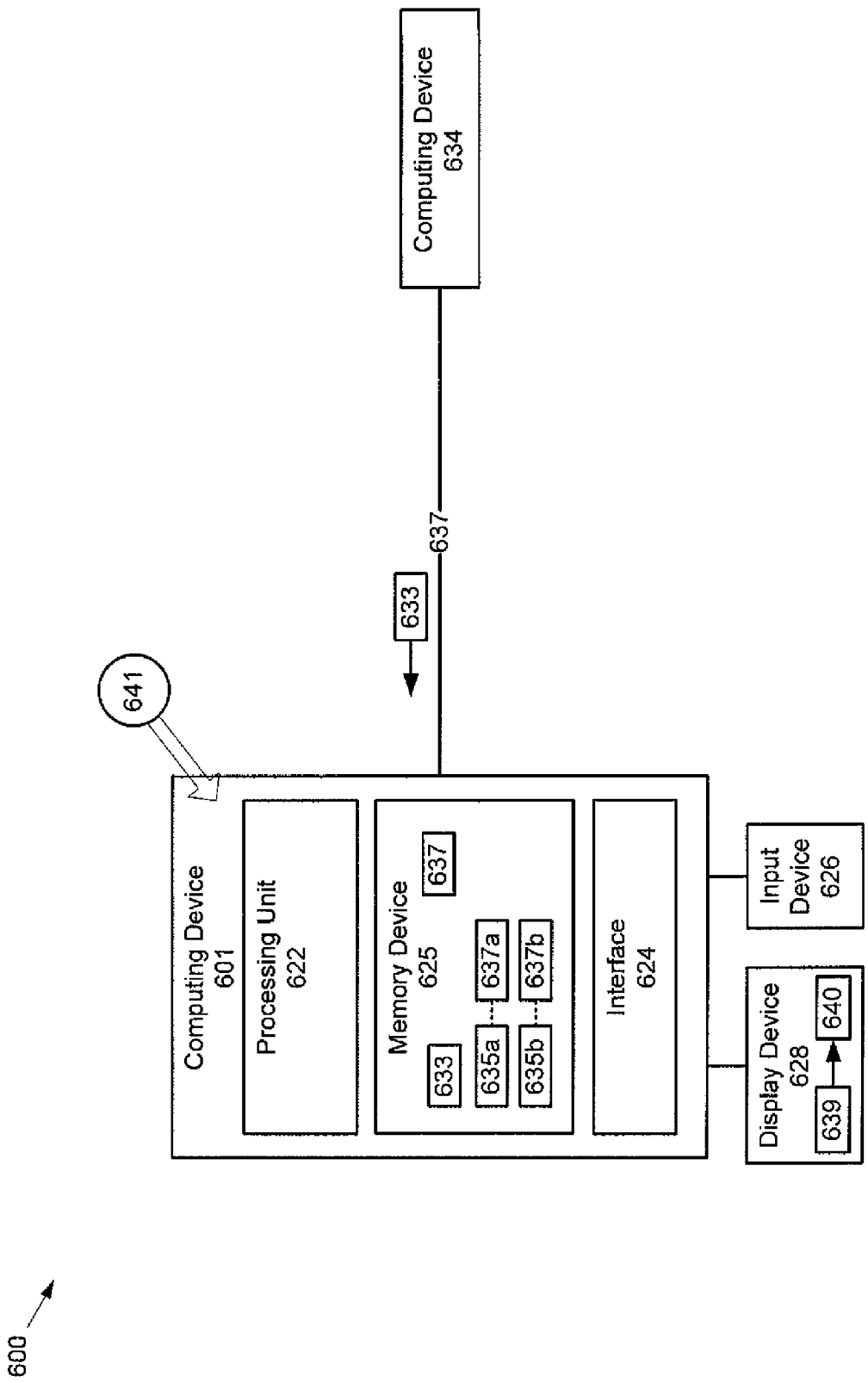
FIG. 6 depicts a block diagram of a system including a computing device for processing data, according to non-limiting embodiments.

Attention is now directed to FIG. 6 which depicts a system 600 comprising a computing device 601 for processing data, according to non-limiting embodiments. System 600 is similar to system 100 with like elements having like numbers. However, first profile data 635a and second profile data 635b (collectively profile data 635 and generically profile data 635) are stored at computing device 601, at memory device 625. Further stored at memory device 625 is rule data 637, similar to rule data 137, comprising rules for visually coding incoming data, such as message data 633, similar to message data 133. First profile data 635a is associated with a first subset 637a of rule data 637, and second profile data 635b is associated with a second subset 637b of rule data 637.

Each of first profile data 635a and second profile data 635b are generated impendent of rule data 637. For example, rule data 637 can be generated and stored at memory device 625. Then first profile data 635a can be generated and stored once rule data 637 is generated and stored. When generating first profile data 635a, subset 637a of rule data 637 can be selected and associated with first profile data 635a. Similarly, when generating second profile data 635b, subset 637b of rule data 637 can be selected and associated with second profile data 635b. However, in some embodiments, rule data 637 can also be added to during generation of first profile data 635a and second profile data 635b.

Figure 7:
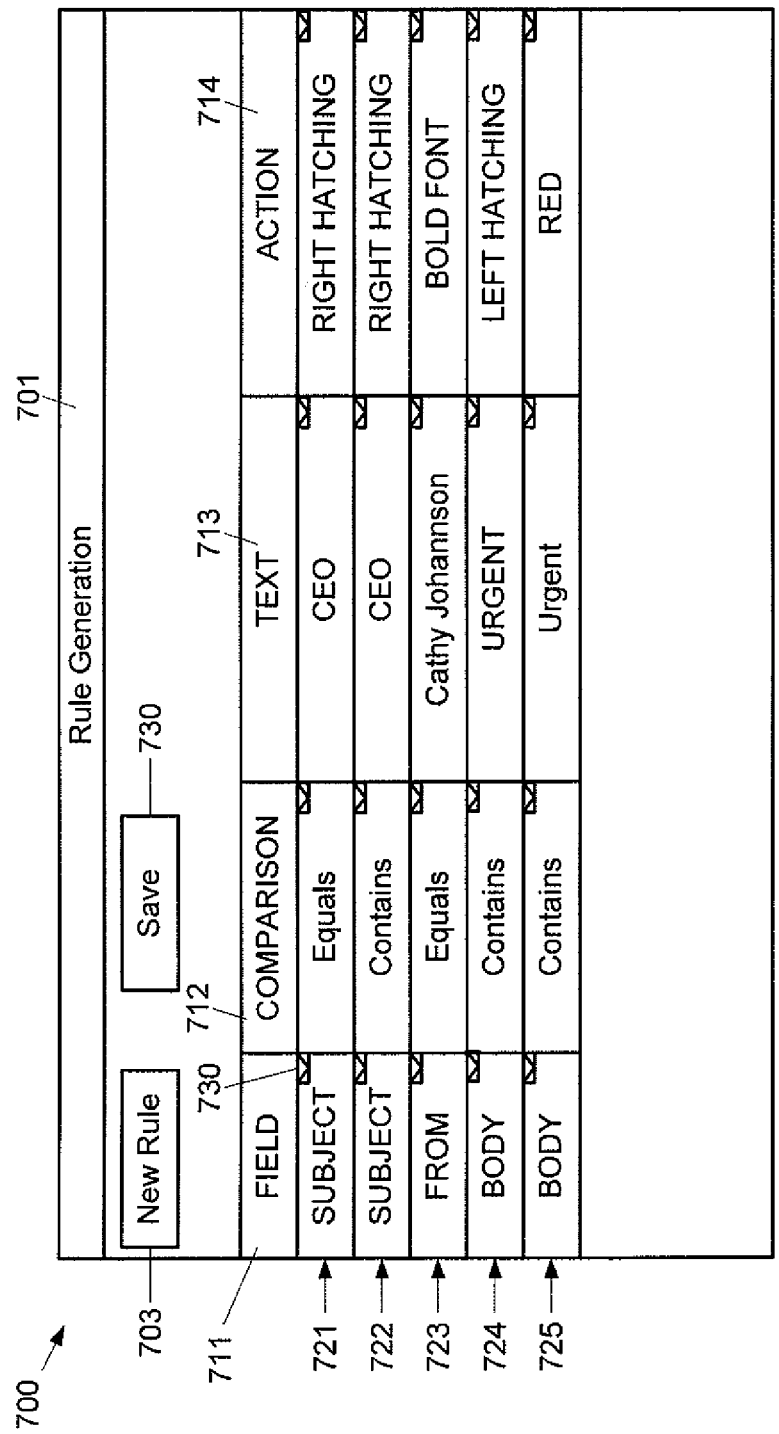
FIG. 7 depicts a representation of an application for generating rule data, according to non-limiting embodiments.

Attention is now directed to FIG. 7, which depicts a representation 700 of an application for generating rules, for example a rule generating view of application 641. For example, in some embodiments, representation 640 can comprise representation 700. Representation 700 can comprise a header 701 identifying representation 700, a virtual button 703 for adding new rules, a "Field" column 711, a "Comparison" column 712, a "Text" column 713, and an "Action" column 714. Each column 711 to 714 comprises rows 721, 722, 723, 724, 725 corresponding to rules in rule data 637: for example, rows 721 to 725 correspond to lines 1 to 5 in Table 1, described above. A field of a message (e.g. an e-mail) can be received (and/or selected via a pull-down menu icon 730) in column 711, a comparison value received and/or selected in column 712, the text to be compared with the field on column 711 can be received and/or selected in column 713, and the resulting action that is to occur, when the text in column 713 compares with the field of column 711 according to the comparator of column 712, can be received and/or selected in column 714. A new rule (e.g. a new row) can be added when button 703 is actuated. Furthermore changes to rules and/or new rules can be saved when a virtual "Save" button 730 is actuated. Such an action causes rule 637 to be generated and/or updated.

While only rules pertaining to fields of messages and/or e-mails are provided in FIG. 7 (and Table 1), it is understood that rule data 637 can comprise any suitable types of rules.

Each of first profile data 635a and second profile data 635b comprises a respective range of time and a respective recurrence pattern that can occur indefinitely. For example, attention is directed to FIG. 8 which depicts a representation 800 of an application for generating first profile data 635a independent of rule data 637, for example a profile generating view of application 641. For example, in some embodiments, representation 640 can comprise representation 800. Representation 800 is can comprise a header 801 for identifying representation 800, a virtual button 803 for adding a new profile data, a "Profile Name" column 811, a "Recurrence" column 812, a "Start Threshold Column" column 813, and an "End Threshold" column 814. Each column 811 to 814 comprises a row 821 corresponding to the recurrence pattern and range of time associated with first profile data 635a. For example, first profile data 635a comprises a name "Weekends", which identifies first profile data 635a. The recurrence pattern of first profile data 635a comprises weekends (e.g. first profile data 635a is to be applied every weekend, when active). It is understood that that the recurrence pattern defined in column 812, e.g. "Weekends" occurs indefinitely. Furthermore, it is understood that the recurrence pattern can comprises at least one of every day, every week, every weekend every holiday, every workday, every workday evening, every vacation and every holiday. In embodiments where the recurrence pattern comprises every vacation and/or every holiday, it understood that the associated profile data 635 is active on every respective day designated as a vacation and/or a holiday in an associated calendar database.

First profile data 635a further comprises a range of time defined by columns 813 and 814 of row 821: 17:00 Friday to 09:00 Monday. For example, column 813 comprises a start threshold of "17:00 Friday" and column 814 comprises an end threshold of "09:00 Monday". Values in columns 813, 814 can be received and/or selected via respective pulldown menu icons such as icon 830.

First profile data 635a further comprises a subset 637a of rule data 637 which can be selected in field 840: field 840 comprises a representation of rule data 637, as generated via representation 700 of FIG. 7, including a line for each rule in rule data 637. Subset 637a can be chosen via checkboxes 842, a checked checkbox indicative that the associated rule, in rule data 637, is a rule in subset 637a, and an unchecked checkbox indicative the associated rule, in rule data 637, is not a rule in subset 637a. As depicted, profile data 635a, "Weekends" corresponds to line 2 of Table 2, and subset 637a corresponds to the rule defined in row 723 of representation 700 (and/or line 3 of Table 1). As such, subset 637a can comprise a copy of the corresponding data in rule data 637 and/or a pointer to the corresponding data in rule data 637.

New profile data 635 and/or changes to profile data 635 can be saved when a virtual "Save" button 850 is actuated. Such an action in representation 800 causes first profile data 635a be generated and/or updated.

Furthermore, actuation of button 803 causes another representation, similar to representation 800, to be generated, so that new profile data 635 (e.g. second profile data 635b) to be generated and stored.

In some embodiments, representation 800 can further comprise a virtual "Add New Rule" button 860. When button 860 is actuated, display device 628 can be controlled to provide representation 700 so that new rule data can be added to rule data 637. When representation 700 is closed, display device 628 is controlled to again display representation 800 with, however, any new rules provided in field 840.

Figure 9:
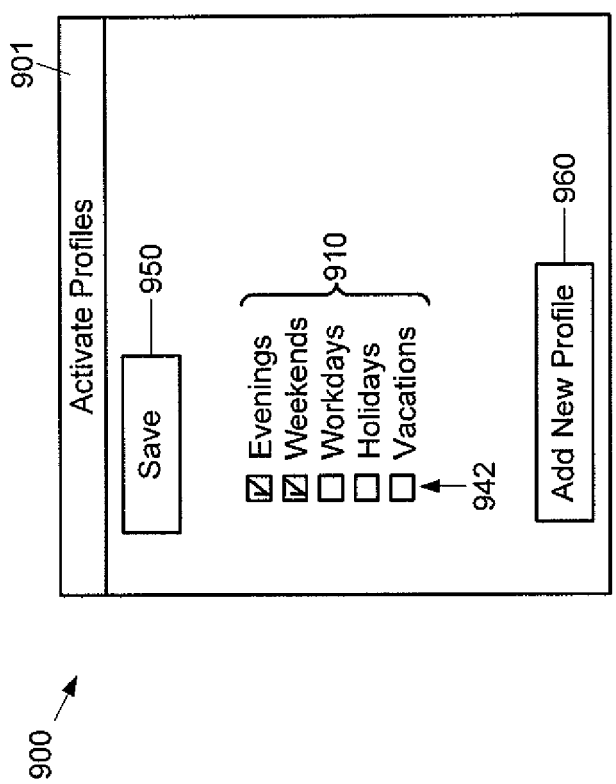
FIG. 9 depicts a representation of an application for activating profile data, according to non-limiting embodiments; and, FIG. 10 depicts a flow chart of a method for processing data, according to non-limiting embodiments.

Attention is now directed to FIG. 9, which depicts a representation 900 of an application for activating profiles, for example profile activation view of application 641. For example, in some embodiments, representation 640 can comprise representation 900. Representation 900 comprises a header 901 identifying representation 900, and a list 910 of profile names, for example profile names from Tables 2 and/or 3, each profile name in list 910 associated with a set profile data: for example profile name "Weekends" can be associated with profile data 635a, while profile name "Evenings" can be associated with profile data 635b. Each profile name in list 910 can be selected via an associated checkbox 942, a checkbox 942 being checked indicative that the associated profile data 635 is activated. Accordingly, receipt of input data from input device 626 indicating that a checkbox is to be checked, comprises an indication that associated profile data 635 has been activated. Representation 900 can further comprise a virtual "Save" button 950 that causes the data received in representation 900 to be saved in memory device 625 when actuated. Representation 900 can further comprise a virtual "Add New Profile" button 960 that causes display device 628 to be controlled to provide representation 800. When representation 800 is closed, display device 628 is controlled to again display representation 900 with however any profiles names provided in list 910.

Figure 10:
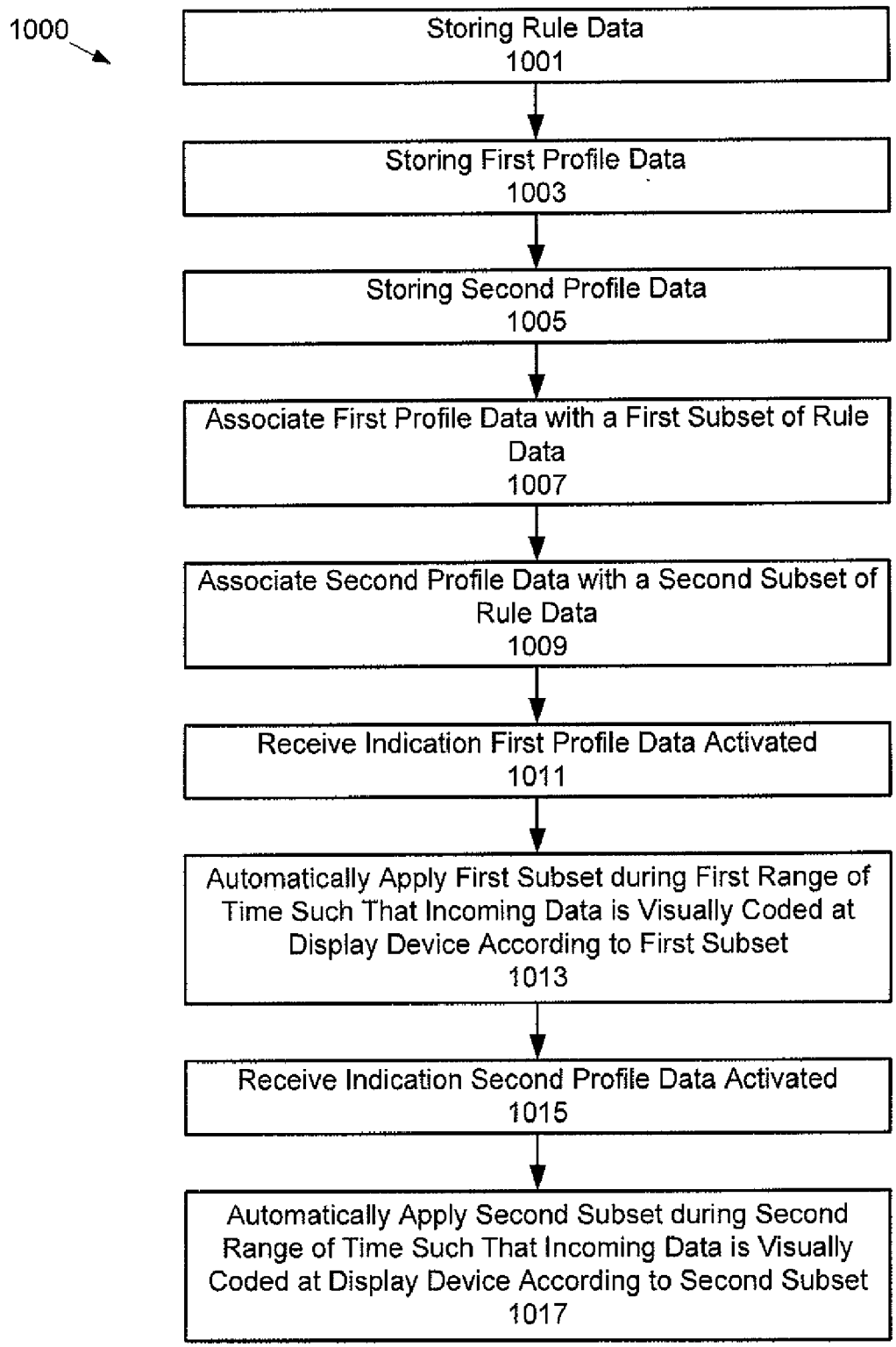

Attention is now directed to FIG. 10 which depicts a method 1000 for processing data on a computing device. In order to assist in the explanation of method 1000, it will be assumed that method 1000 is performed using system 600. Furthermore, the following discussion of method 1000 will lead to a further understanding of system 600 and its various components. However, it is to be understood that system 600 and/or method 1000 can be varied, and need not work exactly as discussed herein in conjunction with each other, and that such variations are within the scope of present embodiments.

At step 1001, rule data 637 is stored, for example via representation 700.

At step 1003, first profile data 635a is stored, for example in memory device 625. First profile data 635a comprises a first range of time and a first recurrence pattern that repeats indefinitely. For example, the first range of time can comprise the range of time defined by columns 813, 814 of representation 800. The first recurrence pattern cab comprises the recurrence pattern defined in column 812 of representation 800. Furthermore, it is understood that step 1003 occurs independently of step 1001 such that first profile data 635a generated independent of rule data 637.

At step 1005, second profile data 635b is stored, for example in memory device 625. Second profile data 635b comprises a second range of time and a second recurrence pattern that repeats indefinitely. The second range of time and the second recurrence pattern can be defined in a representation similar to representation 800. Furthermore, it is understood that step 1005 occurs independently of steps 1001, 1003 such that second profile data 635b generated independent of rule data 637 and first profile data 635a.

At step 1007, first profile data 635a is associated with first subset 637a of rule data 637. Step 1007 can occur in parallel with step with step 1003, for example within representation 800 where subset 637a is chosen from rules within rule data 637.

At step 1009, second profile data 635b is associated with second subset 637b of rule data 637. Step 1009 can occur in parallel with step with step 1005, for example within a representation similar to representation 800 where subset 637b is chosen from rules within rule data 637.

At step 1011, a first indication that first profile data 635a has been activated is received. For example, an indication that an associated profile name in list 910 of FIG. 9 has been selected via a checkbox 942 can be received, indicating first profile data 635*a* has been activated. Hence, first profile data 635*a* can generated upon receipt of input data at input device 626.

Figure 8:
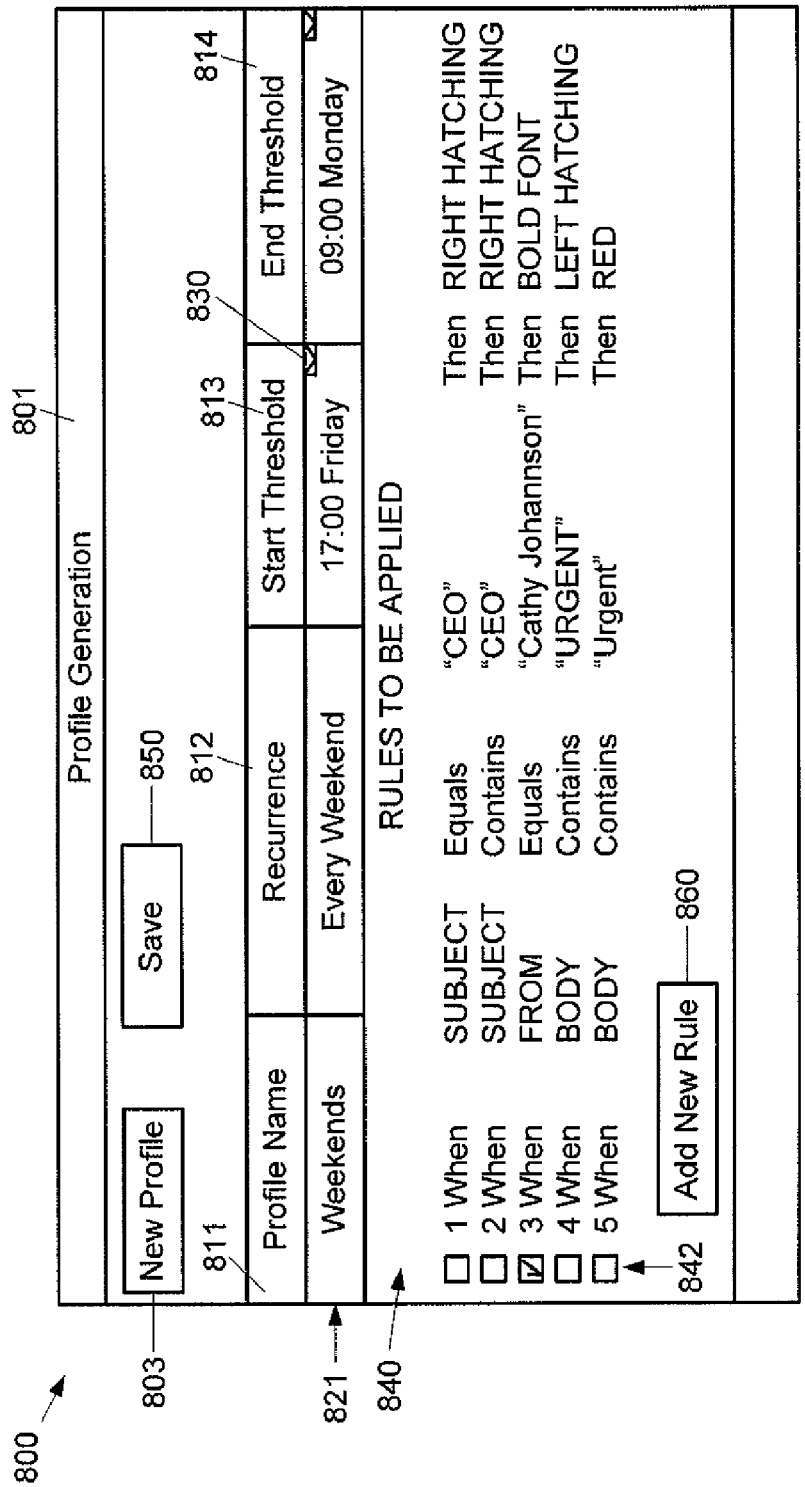
FIG. 8 depicts a representation of an application for generating profile data independent of rule data, according to non-limiting embodiments.

It is understood that the first range of time can comprise a first start threshold and a first end threshold, as depicted in FIG. 8. Hence, step 1011 can comprise receiving an indication that the first start threshold has been met, for example as in step 503 of method 500.

In response, at step 1013, first subset 637*a* is automatically applied during the first range of time such that incoming data is visually coded at display device 628 according to first subset 637*a* during the first range of time. It is understood that automatic application of first subset 635*a* during the first range of time repeats indefinitely according to the first recurrence pattern until a second indication that first profile data 635*a* has been deactivated is received. For example, the second indication can comprise an indication that the associated profile name in list 910 of FIG. 9 has been unselected via the associated checkbox 942 being unchecked.

At step 1015, a third indication that second profile data 635*b* has been activated is received. For example, an indication that an associated profile name in list 910 of FIG. 9 has been selected via a checkbox 942 can be received, indicating second profile data 635*b* has been activated. Hence, second profile data 635*b* can generated upon receipt of input data at input device 626.

It is understood that the second range of time can comprise a second start threshold and a second end threshold, similar to those depicted in FIG. 8. Hence, step 1015 can comprise receiving an indication that the second start threshold has been met, for example as in step 503 and/or step 507 of method 500.

In response, at step 1017, second subset 637*b* is automatically applied during the first range of time such that incoming data is visually coded at display device 628 according to second subset 637*b* during the first range of time. It is understood that automatic application of second subset 637*b* during the second range of time repeats indefinitely according to the second recurrence pattern until a fourth indication that second profile data 635*b* has been deactivated is received. For example, the fourth indication can comprise an indication that the associated profile name in list 910 of FIG. 9 has been unselected via the associated checkbox 942 being unchecked.

In some embodiments, method 1000 can further comprise updating at least one of the first range of time, the first recurrence pattern, the second range of time and the second recurrence pattern based on at least one of usage of computing device and user behaviour, as described above.

In further embodiments, method 1000 can further comprise automatically deactivating first profile data 635*a* when second profile data 635*b* is activated. For example, when step 1015 occurs, first profile data 635*a* can be automatically deactivated. Hence, in these embodiments, only one set of profile data 635 is active at any given time.

However, in other embodiments, method 1000 can further comprise resolving conflicts between first profile data 635*a* and second profile data 635*b* based on respective priorities, as described above. For example, in these embodiments, both first profile data 635*a* and second profile data 635*b* can be active at the same time, hence steps 1013 and 1017 occur in parallel. However, when conflicts occur, priorities associated with each of first profile data 635*a* and second profile data 635*b* can resolve the conflicts. For example, subset 637*a* can indicate that a field in an e-mail is to be shaded blue when given text is present therein, while subset 637*b* can indicate that the same field is to be shaded red when the same given text is present therein. Priorities assigned to the associated profile data 635 can resolve the conflicts.

In any event, by storing first and second profile data, independent of rule data, and associating subsets of rule data with each of the first and second profile data, and by activating the first and second rule data, incoming data can be visually coded according to the respective subsets during ranges of time and recurrence patterns associated with each of the first and second profile data. Hence, subsets of rule data can be applied by activating profile data, providing more flexibility over when rules are applied and which rules are applied, ultimately leading to less use of computing resources in applying rules to incoming data. This hence addresses a technical problem of overuse of computing resources when applying rules to incoming data as various views of rules are opened and processed, and a processing unit controls a display device (and an associated cache) to provide the various views. Furthermore the rule data is not adequately grouped and applied in a fragmented manner. In contrast, in present embodiments, by introducing profile data and associating subsets of rule data therewith, a computing device processes a smaller number of views, leading to a more efficient use of the cache of the display device, and furthermore organizes and applies rule data in a more efficient manner.

Those skilled in the art will appreciate that in some embodiments, the functionality of computing devices 101, 601 can be implemented using pre-programmed hardware or firmware elements (e.g., application specific integrated circuits (ASICs), electrically erasable programmable read-only memories (EEPROMs), etc.), or other related components. In other embodiments, the functionality of computing devices 101, 601 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM (compact disc read only memory), ROM (read only memory), fixed disk, USB (Universal Serial Bus) drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for processing data on a computing device, said computing device comprising a processing unit interconnected with a display device, said method comprising:

storing rule data comprising data for visually coding incoming data;

storing first profile data comprising a first range of time and a first recurrence pattern that repeats indefinitely, said first profile data generated independent of said rule data;

storing second profile data comprising a second range of time and a second recurrence pattern that repeats indefinitely, said second profile data generated independent of said rule data and said first profile data;

associating said first profile data with a first subset of said rule data;

associating said second profile data with a second subset of said rule data;

receiving a first indication that said first profile data has been activated and in response automatically applying said first subset during said first range of time such that said incoming data is visually coded at said display device according to said first subset during said first range of time, automatic application of said first subset during said first range of time repeating indefinitely according to said first recurrence pattern until a second indication that said first profile data has been deactivated is received; and receiving a third indication that said second profile data has been activated and in response automatically applying said second subset during said second range of time such that said incoming data is visually coded at said display device according to said second subset during said second range of time, automatic application of said second subset during said second range of time repeating indefinitely according to said second recurrence pattern until a fourth indication that said first profile data has been deactivated is received.

2. The method of claim 1, wherein said first profile data and said second profile data are each generated upon receipt of respective input data at an input device interconnected with said processing unit.

3. The method of claim 1, wherein said first range of time comprises a first start threshold and a first end threshold, said receiving said first indication that said first profile data has been activated comprising receiving an indication that said first start threshold has been met, and said second indication comprising an indication that said first end threshold has been met.

4. The method of claim 1, wherein said second range of time comprises a second start threshold and a second end threshold, said receiving said third indication that said second profile data has been activated comprising receiving an indication that said second start threshold has been met, and said fourth indication comprising an indication that said second end threshold has been met.

5. The method of claim 1, wherein each of said first recurrence pattern and said second recurrence pattern comprises at least one of every day, every week, every weekend every holiday, every workday, every workday evening, every vacation and every holiday.

6. The method of claim 1, further comprising updating at least one of said first range of time, said first recurrence pattern, said second range of time and said second recurrence pattern based on at least one of usage of said computing device and user behaviour.

7. The method of claim 1, further comprising deactivating said first profile data when said second profile data is activated.

8. The method of claim 1, further comprising resolving conflicts between said first profile data and said second profile data based on respective priorities.

9. The method of claim 1, wherein said processing unit is further interconnected with a memory device storing said profile data and said rule data.

10. The method of claim 1, wherein said automatically applying said first profile data and said automatically applying said second profile data occurs in an application on said computing device, said application comprising at least one of a messaging application, an e-mail application, a voicemail application, an instant messaging application, an MMS (multimedia messaging service) application, an SMS (short message service) application, and a texting application, and said incoming data comprising message data.

11. A computing device for processing data, comprising:
a memory device; and
a processing unit interconnected with the memory device and a display device, said processing unit enabled to:
store rule data in said memory device, said rule data comprising data for visually coding incoming data;
store first profile data in said memory device, said first profile data comprising a first range of time and a first recurrence pattern that repeats indefinitely, said first profile data generated independent of said rule data;
store second profile data in said memory device, said second profile data comprising a second range of time and a second recurrence pattern that repeats indefinitely, said second profile data generated independent of said rule data and said first profile data;
associate said first profile data with a first subset of said rule data;
associate said second profile data with a second subset of said rule data;
receive a first indication that said first profile data has been activated and in response automatically apply said first subset during said first range of time such that said incoming data is visually coded at said display device according to said first subset during said first range of time, automatic application of said first subset during said first range of time repeating indefinitely according to said first recurrence pattern until a second indication that said first profile data has been deactivated is received; and
receive a third indication that said second profile data has been activated and in response automatically apply said second subset during said second range of time such that said incoming data is visually coded at said display device according to said second subset during said second range of time, automatic application of said second subset during said second range of time repeating indefinitely according to said second recurrence pattern until a fourth indication that said first profile data has been deactivated is received.

12. The computing device of claim 11, wherein said first profile data and said second profile data are each generated upon receipt of respective input data at an input device interconnected with said processing unit.

13. The computing device of claim 11, wherein said first range of time comprises a first start threshold and a first end threshold, said processing unit further enabled to receive said first indication that said first profile data has been activated by receiving an indication that said first start threshold has been met, and said second indication comprising an indication that said first end threshold has been met.

14. The computing device of claim 11, wherein said second range of time comprises a second start threshold and a second end threshold, said processing unit further enabled to receive said third indication that said second profile data has been activated comprising receiving an indication that said second start threshold has been met, and said fourth indication comprising an indication that said second end threshold has been met.

15. The computing device of claim 11, wherein each of said first recurrence pattern and said second recurrence pattern comprises at least one of every day, every week, every weekend every holiday, every workday, every workday evening, every vacation and every holiday.

16. The computing device of claim 11, wherein said processing unit is further enabled to update at least one of said first range of time, said first recurrence pattern, said second range of time and said second recurrence pattern based on at least one of usage of said computing device and user behaviour.

17. The computing device of claim 11, wherein said processing unit is further enabled to deactivate said first profile data when said second profile data is activated.

18. The computing device of claim 11, wherein said processing unit is further enabled to resolve conflicts between said first profile data and said second profile data based on respective priorities.

19. The computing device of claim 11, wherein said processing unit is further enabled to automatically apply said first profile data and said automatically apply said second profile data in an application on said computing device, said application comprising at least one of a messaging application, an e-mail application, a voicemail application, an instant messaging application, an MMS (multimedia messaging service) application, an SMS (short message service) application, and a texting application, and said incoming data comprising message data.

20. A computer program product, comprising a non-transitory computer readable storage medium having a computer readable program code adapted to be executed to implement a method for processing data on a computing device, said computing device comprising a processing unit interconnected with a display device, said method comprising:
    storing rule data comprising data for visually coding incoming data;
    storing first profile data comprising a first range of time and a first recurrence pattern that repeats indefinitely, said first profile data generated independent of said rule data;
    storing second profile data comprising a second range of time and a second recurrence pattern that repeats indefinitely, said second profile data generated independent of said rule data and said first profile data;
    associating said first profile data with a first subset of said rule data;
    associating said second profile data with a second subset of said rule data;
    receiving a first indication that said first profile data has been activated and in response automatically applying said first subset during said first range of time such that said incoming data is visually coded at said display device according to said first subset during said first range of time, automatic application of said first subset during said first range of time repeating indefinitely according to said first recurrence pattern until a second indication that said first profile data has been deactivated is received; and
    receiving a third indication that said second profile data has been activated and in response automatically applying said second subset during said second range of time such that said incoming data is visually coded at said display device according to said second subset during said second range of time, automatic application of said second subset during said second range of time repeating indefinitely according to said second recurrence pattern until a fourth indication that said first profile data has been deactivated is received.

* * * * *